UNITED STATES PATENT OFFICE.

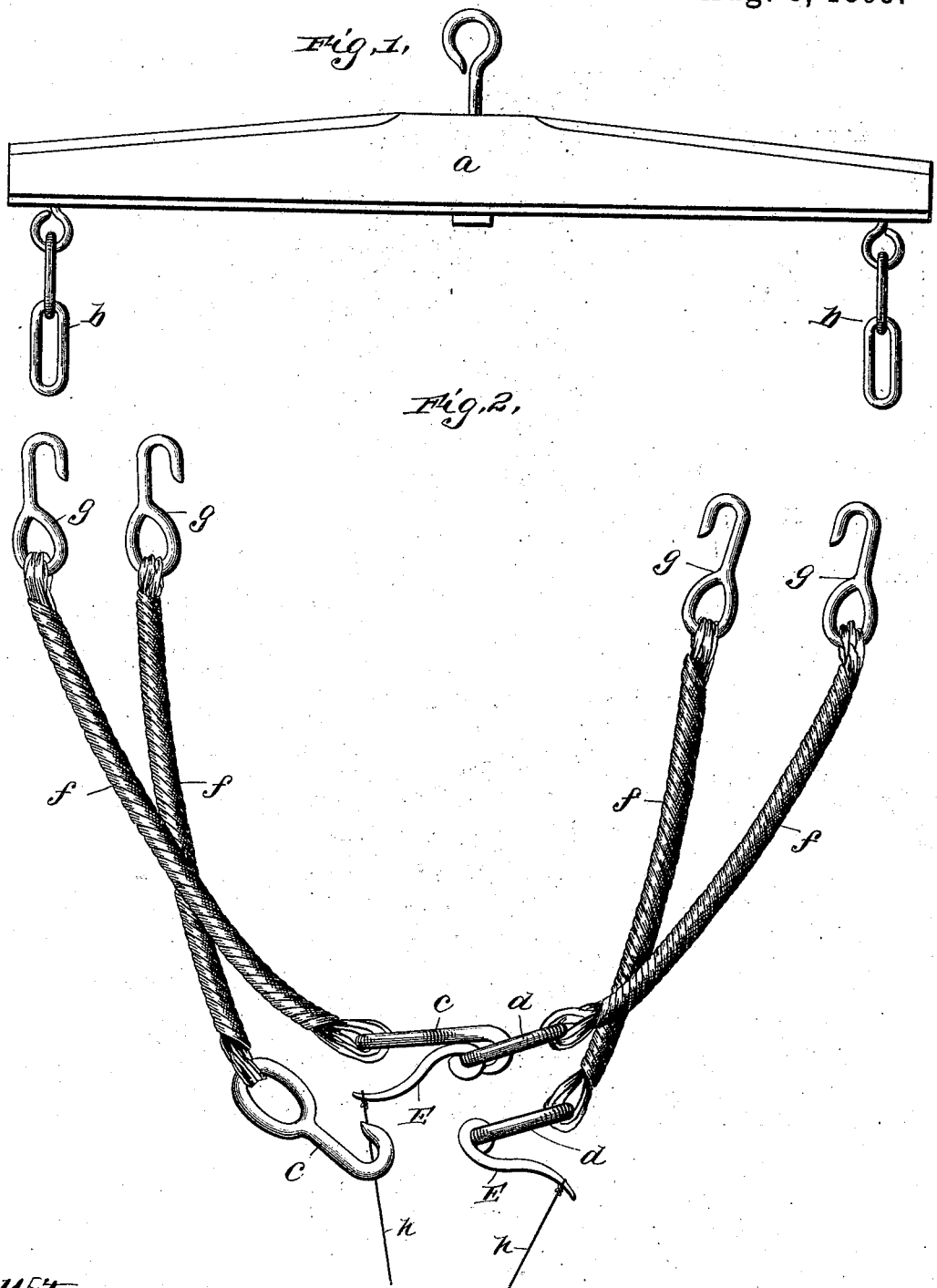

LEWIS J. HELLAND, OF MANSFIELD, MINNESOTA.

HAY-SLING.

SPECIFICATION forming part of Letters Patent No. 502,721, dated August 8, 1893.

Application filed February 14, 1893. Serial No. 462,338. (No model.)

*To all whom it may concern:*

Be it known that I, LEWIS J. HELLAND, a citizen of the United States, residing at Mansfield, in the county of Freeborn and State of Minnesota, have invented a new and useful Apparatus for Unloading Hay in the Barn or on Stack, of which the following is a specification.

My invention consists of four ropes, (connected by the trip attachment) placed across the front half and four across the hind half of the hay-rack, before the load is loaded, and a cross-beam which is suspended from the carrier. When the load is on, the ends of the ropes on either end of the rack are hitched to chains, suspended from the cross beam, and the half load is lifted.

Figure (1) is a view of the cross beam (a) and chains (b). Fig. (2) is a view of the ropes with hooks and trip attachment.

The crossbeam (a) has a hooked bolt through its center, to which the carrier hook is hitched. The chains (b) are attached to the ends of the crossbeam by hooked bolts.

The trip attachment consists of a hook (c) and a link (d), on one end of which is bent a steel strap (e) with which the hook is thrown out of the link. At the other ends of the ropes (f) are hooks (g) which are hitched to the chains (b) when the load is to be lifted. The tripping is done by ropes (h) extending from the straps (e) to where the operator stands.

I claim—

A hay sling comprising a cross-beam provided with suspending chains, load-supporting ropes having hooks at one end adapted to be attached to said chain, said ropes being provided at the other end with a trip device consisting of a hook, a link, and a strap the construction and arrangement being such that by the rotation of the strap the hook is detached from the link, substantially as and for the purpose set forth.

LEWIS J. HELLAND.

Witnesses:
JOHN SEVERSON,
N. H. RASMUSSON.